(12) United States Patent  
Sugiura et al.

(10) Patent No.: US 7,070,872 B2  
(45) Date of Patent: *Jul. 4, 2006

(54) FUEL CELL STACK

(75) Inventors: Seiji Sugiura, Utsunomiya (JP); Hiroyuki Tanaka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 379 days.

This patent is subject to a terminal disclaimer.

(21) Appl. No.: 10/256,409

(22) Filed: Sep. 27, 2002

(65) Prior Publication Data

US 2003/0064277 A1 Apr. 3, 2003

(30) Foreign Application Priority Data

Sep. 28, 2001 (JP) .............................. 2001-302055

(51) Int. Cl.
*H01M 8/12* (2006.01)
*H01M 2/00* (2006.01)
*H01M 2/02* (2006.01)

(52) U.S. Cl. ......................................... 429/26; 429/34
(58) Field of Classification Search ................. 429/34, 429/20

See application file for complete search history.

(56) References Cited

U.S. PATENT DOCUMENTS 5,981,098 A * 11/1999 Vitale .......................... 429/34

FOREIGN PATENT DOCUMENTS

JP 5-82153 * 4/1993

* cited by examiner

*Primary Examiner*—Patrick Joseph Ryan
*Assistant Examiner*—Julian Mercado
(74) *Attorney, Agent, or Firm*—Lahive & Cockfield, LLP; Anthony A. Laurentano, Esq.

(57) ABSTRACT

A first membrane electrode assembly is interposed between a first separator and a second separator. A second membrane electrode assembly is interposed between the second separator and another first separator. The second separator includes a first separator plate, a second separator plate, and a leaf spring interposed between the first separator plate and the second separator plate. Each of the first separator plate and the second separator plate has an embossed section made up of first protrusions protruding toward the leaf spring and first recesses spaced from the leaf spring. The first protrusions of the embossed section in one separator plate are in alignment with the first recesses of the embossed section in the other separator plate, respectively.

6 Claims, 13 Drawing Sheets

FUEL CELL STACK

BACKGROUND OF THE INVENTION

1. Field of the Invention

The present invention relates to a fuel cell stack comprising a stacking body formed by stacking a plurality of assemblies each interposed between separators. Each of the assemblies includes an anode, a cathode, and an electrolyte interposed between the anode and the cathode. The stacking body is tightened by a pair of end plates provided at opposite ends of the stacking body in the stacking direction.

2. Description of the Related Art

In recent years, various types of fuel cells are developed. For example, a solid polymer electrolyte fuel cell is known. The solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon sheet. The membrane electrode assembly is interposed between separators (bipolar plates). The membrane electrode assembly and the separators make up a unit of the fuel cell (unit cell) for generating electricity. A plurality of unit cells are connected together to form a fuel cell stack.

In the fuel cell of the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

The fuel cell stack is attractive for use in vehicles. For example, FIG. 13 shows a fuel cell stack 10 mounted on a vehicle body 1 of a vehicle such as an automobile. In the fuel cell stack 10, a plurality of unit cells 12 are electrically connected in series. In FIG. 13, the unit cells 12 are stacked laterally to form a stacking body 13.

Each of the unit cells 12 includes a pair of separators 22a, 22b and a membrane electrode assembly 20 interposed between the separators 22a, 22b. The membrane electrode assembly 20a includes an anode 14, a cathode 16, and an ion exchange membrane (electrolyte layer) 18, interposed between the anode 14 and the cathode 16. Each of the separators 22a, 22b has a first gas flow passage 24 on its surface facing the anode 14, and has a second gas flow passage 26 on its surface facing the cathode 16. A fuel gas such as a hydrogen-containing gas flows along the anode 14 through the first gas flow passage 24, and an oxygen-containing gas such as air flows along the cathode 16 through the second gas flow passage 26.

Terminal plates 34a, 34b are electrically connected to the outermost unit cells 12 disposed at opposite ends of the stacking body 13 in the stacking direction, respectively. Insulator plates 36a, 36b for prevention of electric leakage are stacked on the outside of the terminal plates 34a, 34b, respectively. End plates 38a, 38b are stacked on the outside of insulator plates 36a, 36b, respectively. Further, back up plates 40a, 40b are disposed outside the end plates 38a, 38b, respectively. The unit cells 12, the terminal plate 34a, 34b, the insulator plates 36a, 36b, end plates 38a, 38b, and back up plates 40a, 40b make up the fuel cell stack 10.

A plurality of spring members 42 such as belleville-springs are interposed between the end plate 38a and the back up plate 40a for maintaining electrical connections between the adjacent unit cells 12.

In the peripheral area of the fuel cell stack 10, a plurality of through holes 44 are formed. The through holes 44 extend from the back up plate 40a to the other back up plate 40b. Tie rods 46 are inserted into the through holes 44, respectively. Nuts 48 are threaded over the tie rods 46 to tighten the back up plates 40a, 40b. Therefore, the stacking body 13, the terminal plate 34a, 34b, and the end plates 38a, 38b are pressed together, and the belleville-springs 42 are compressed.

The fuel cell stack 10 is mounted on a vehicle body 1 by brackets 50, 52. The brackets 50, 52 are connected to the end plate 38a, the back up plate 40b, respectively. The bracket 52 is fixed to the vehicle body 1 by a bolt 54. The bracket 50 is slidable on the vehicle body 1.

An arm 56 extends from a lower end of the bracket 50. An oblong groove 60 having a step 58 is formed in the arm 56. A bolt 62 is inserted in the oblong groove 60. The step 58 is pressed by a head of the bolt 52 with a suitable force. In this manner, the bracket 50 is slidably mounted on the vehicle body 1.

When the stacking body 13 is thermally expanded in the stacking direction during the operation of the fuel cell stack 10, the belleville-springs 42 are compressed to some extent corresponding to the amount of thermal expansion. When the operation of the fuel cell stack 10 is stopped, and the temperature of the fuel cell stack 10 is lowered, the stacking body 13 is thermally contracted. Therefore, the belleville-springs 42 are stretched. The thermal expansion or contraction of the stacking body 13 causes the belleville-springs 42 to be compressed or stretched. Therefore, the tightening force applied to the stacking body 13 is maintained substantially.

The electrolyte layer 18 absorbs and releases water produced in the electrochemical reaction. Further, the electrolyte layer 18 absorbs and releases moisture in the fuel gas and the oxygen-containing gas. Therefore, the electrolyte layer 18 swells and shrinks in the stacking direction of the stacking body 13. Further, the membrane electrode assembly 20 wears out with the repeated use of the fuel cell stack 10. Therefore, the rigidity of the membrane electrode assembly 20 is reduced, and the size of the membrane electrode assembly 20 is reduced slightly. The size reduction also occurs in the sealing member for supporting the membrane electrode assembly 20, and the separators 22a, 22b.

In the fuel cell stack 10, when the dimension of the components such as the electrolyte layer 18, the sealing member, the separators 22a, 22b changes in the stacking direction, the belleville-springs 42 are compressed or stretched correspondingly. Therefore, the stacking body 13 is constantly pressed together under a desirable pressure.

When the dimension of the components changes in the fuel cell unit 10, and the belleville-springs 42 are compressed or stretched, the bracket 50 guided by the oblong groove 60 and the bolt 62 slides on the vehicle body 1 in the stacking direction.

In the fuel cell stack 10, the bracket 50 is slidably mounted on the vehicle body 1. If both of the brackets 50, 52 are fixed on the vehicle body 1, large heat stress is applied to the fuel cell stack 1 due to the thermal expansion of the stacking body 13. Therefore, the bracket 50 is not fixedly mounted the vehicle body 1.

Since the bracket 50 is slidable on the vehicle body 1, it is not possible to apply large pressure equally to each of the unit cells 12, and to reduce the electric resistance in each of the unit cells 12 and between the adjacent unit cells 12. Therefore, the end plates 38a, 38b need to be thick, for example, for reducing the electric resistance between the adjacent unit cells 12.

When the fuel cell stack 10 is mounted on the vehicle body 1, vibrations and impacts generated while the vehicle is moving are applied to the bracket 52 only. Therefore, the bracket 52 needs to be large. Since both of the end plates 38a, 38b are not firmly fixed, the positions of the end plates 38a, 38b may be displaced undesirably due to the vibrations of the vehicle body 1. Further, the vibrations of the vehicle body 1 may decrease the sealing pressure on the surfaces of the components in the fuel cells tack 10, and leakage of the reactant gas or the coolant may occur.

SUMMARY OF THE INVENTION

A main object of the present invention to provide a compact fuel cell stack having a simple structure in which the dimension of a stacking body in the stacking direction does not change when components in the stacking body is thermally expanded, for example.

In the present invention, a fuel cell stack comprises a stacking body formed by stacking a plurality of assemblies each interposed between separators. Each of the assemblies includes an anode, a cathode, and an electrolyte interposed between the anode and the cathode. At least one of the separators includes a pair of separator plates and a metal plate interposed between the separator plates.

In each of the separator plates, an embossed section comprising protrusions protruding toward the metal plate and recesses spaced from the metal plate is provided. The embossed section is formed on at least a part of the separator plate. The protrusions of the embossed section in one separator plate are in alignment with the recesses of the embossed section in the other separator plate, respectively.

In this arrangement, when unit cells are thermally expanded or contracted, when the electrolytes are swelled or shrunk by absorption or release of water produced in the electrochemical reaction, when the rigidity of the membrane electrode assemblies, sealing members, separators or the like is reduced, i.e., when the dimension of the components of the fuel cell stack is changed in the stacking direction, the metal plate is pressed by the protrusions in the embossed section of one separator, and elastically deformed toward the recesses in the embossed section of the other separator. The elastic deformation of the metal plate creates an elastic force in the unit cell. The unit cells of the stacking body are pressed together, and electrical connections between the adjacent unit cells are suitably maintained.

The unit cells in the stacking body are pressed together by the metal plates. Therefore, unlike the conventional fuel cell stack, in the present invention, it is not necessary to use any belleville-springs or back up plates in the fuel cell stack. It is possible to reduce the dimension of the unit cells of the fuel stack in the stacking direction, and reduce the weight of the fuel cell stack.

The stacking body is tightened by a pair of end plates provided on opposite ends of the stacking body. Brackets are connected to the end plates for mounting the fuel cell stack on the vehicle. Since the unit cells in the stacking body are pressed together by the elastic deformation of the metal plates, unlike the conventional fuel cell stack, the fuel cell stack of the present invention can be mounted firmly on the vehicle without mounting one of the brackets slidably on a predetermined member of the vehicle. In comparison with the conventional fuel cell stack in which one of the bracket is slidably mounted on the vehicle, the load applied to the bracket is considerably reduced. Therefore, it is possible to use small and light brackets. Therefore, the space needed for installing the fuel cell stack is small, and the total weight of the vehicle is also small.

Preferably, the brackets are mounted on the vehicle body of the vehicle, for example. Thus, the fuel cell stack of the present invention can be suitably mounted on the vehicle. The vehicle herein means any vehicle which uses the electromotive force of the fuel cell stack as a driving source, including, but not limited to, an automobile.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
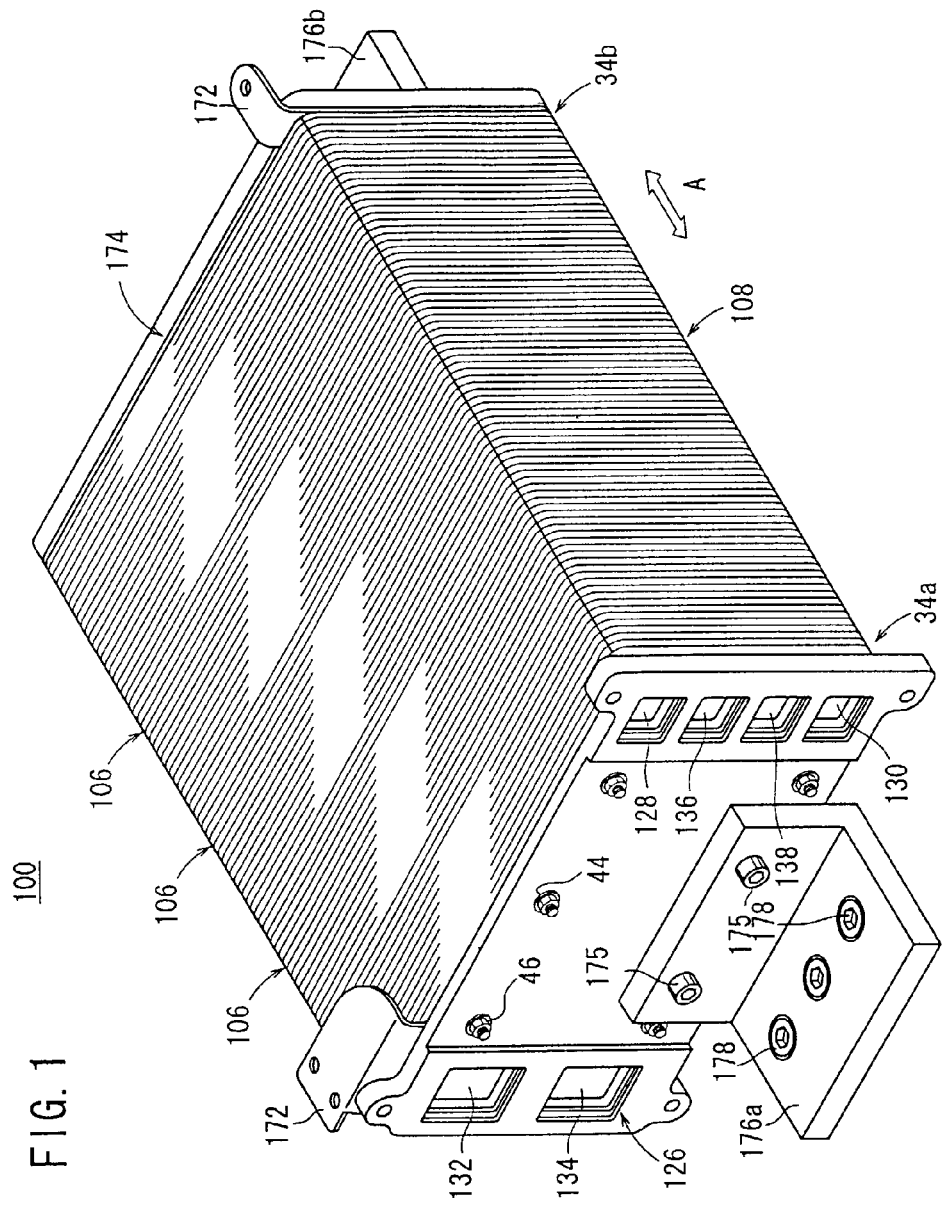
FIG. 1 is a schematic view showing a fuel cell stack according to a first embodiment of the present invention.
Figure 13:
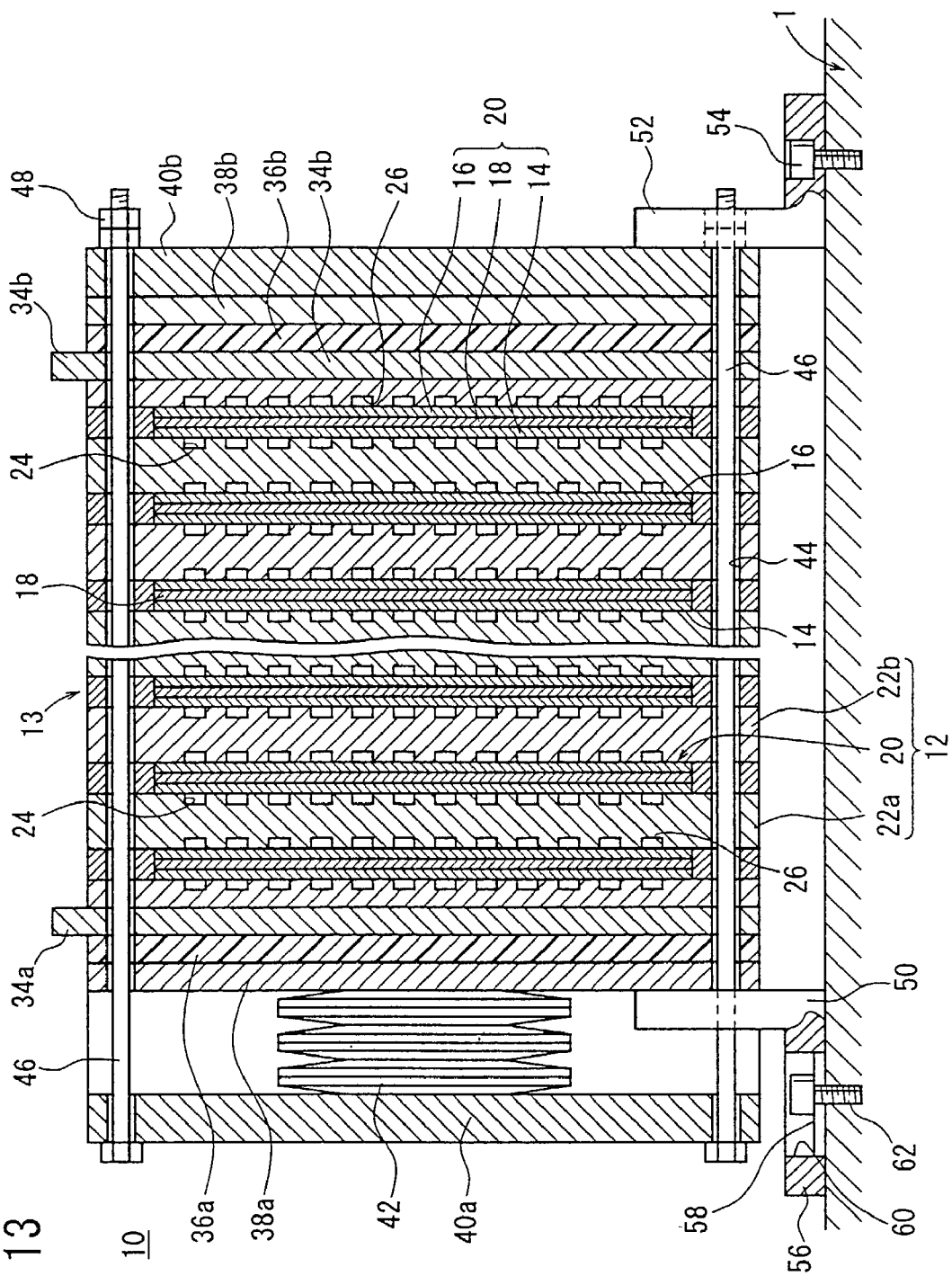
FIG. 13 is a schematic side view of a conventional fuel cell stack taken along the staking direction.

FIG. 1 is a schematic view showing a fuel cell stack 100 according to a first embodiment of the present invention. In the following description, the constituent elements that are identical to those shown in FIG. 13 are labeled with the same reference numeral, and description thereof is omitted.

Figure 2:
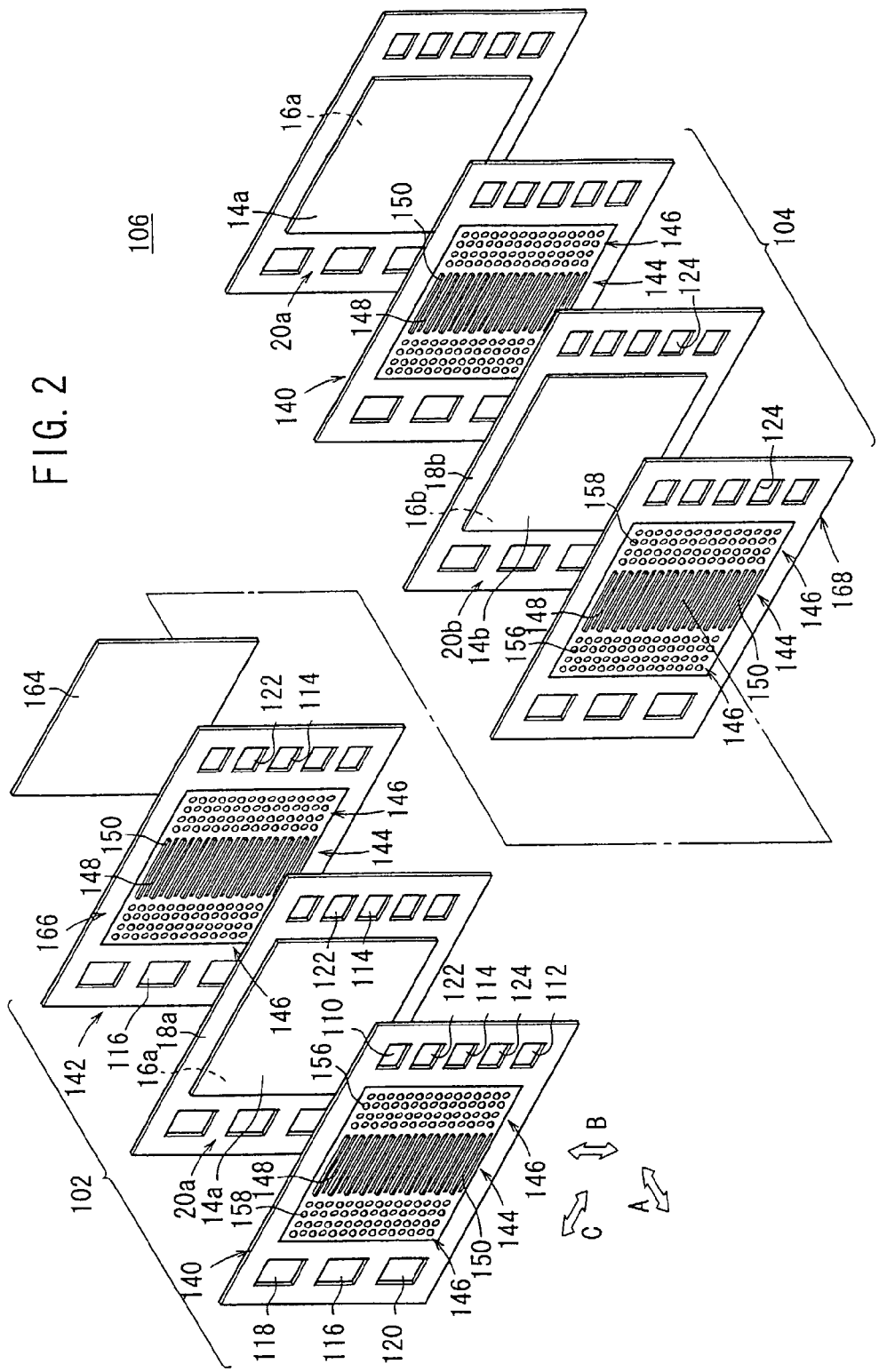
FIG. 2 is an exploded perspective view showing a first unit cell and a second unit cell of the fuel cell stack in FIG. 1.

As shown in FIG. 2, in the fuel cell stack 100, a first unit of a fuel cell (first unit cell) 102 and a second unit of a fuel cell (second unit cell) 104 are stacked together to form the cell assembly 106. A plurality of the cell assemblies 106 are stacked together, and electrically connected in series in a direction indicated by an arrow A to form a stacking body 108 shown in FIG. 1.

As shown in FIG. 2, at an end of the cell assemblies 106, an oxygen-containing gas supply passage 110, an oxygen-containing gas discharge passage 112, an intermediate fuel gas passage 114, a coolant discharge passage 122, and a coolant supply passage 124 are formed. These passages extend in the stacking direction indicated by the arrow A. An oxygen-containing gas is supplied to the cell assemblies 106 through the oxygen-containing gas supply passage 110, and discharged form the cell assemblies 106 through the oxygen-containing gas discharge passage 112. A coolant is supplied to the cell assemblies 106 through the coolant supply passage 122, and discharged from the cell assemblies 106 through the coolant discharge passage 124.

At the other end of the cell assemblies 106, an intermediate oxygen-containing gas passage 116, a fuel gas supply passage 118, and a fuel gas discharge passage 120 are formed. The intermediate oxygen-containing gas passage 116 is connected to the oxygen-containing gas supply passage 110 and the oxygen-containing gas discharge passage 112. A fuel gas such as a hydrogen-containing gas is supplied to the cell assemblies 106 through the fuel gas supply passage 118, and discharged from the cell assemblies 106 through the fuel gas discharge passage 120.

As shown in FIG. 1, the fuel cell stack 100 includes an end plate 126 having an oxygen-containing gas supply port 128, an oxygen-containing gas discharge port 130, a fuel gas supply port 132, a fuel gas discharge port 134, a coolant supply port, 136, and a coolant discharge port 138. The oxygen-containing gas supply port 128 is connected to the oxygen-containing gas supply passage 110, the oxygen-containing gas discharge port 130 is connected to the oxygen-containing gas discharge passage 112, the fuel gas supply port 132 is connected to the fuel gas supply passage 118, the fuel gas discharge port 134 is connected to the fuel gas discharge passage 120, the coolant supply port 136 is connected to the coolant supply passage 122, and the coolant discharge port 138 is connected to the coolant discharge passage 124.

Figure 3:
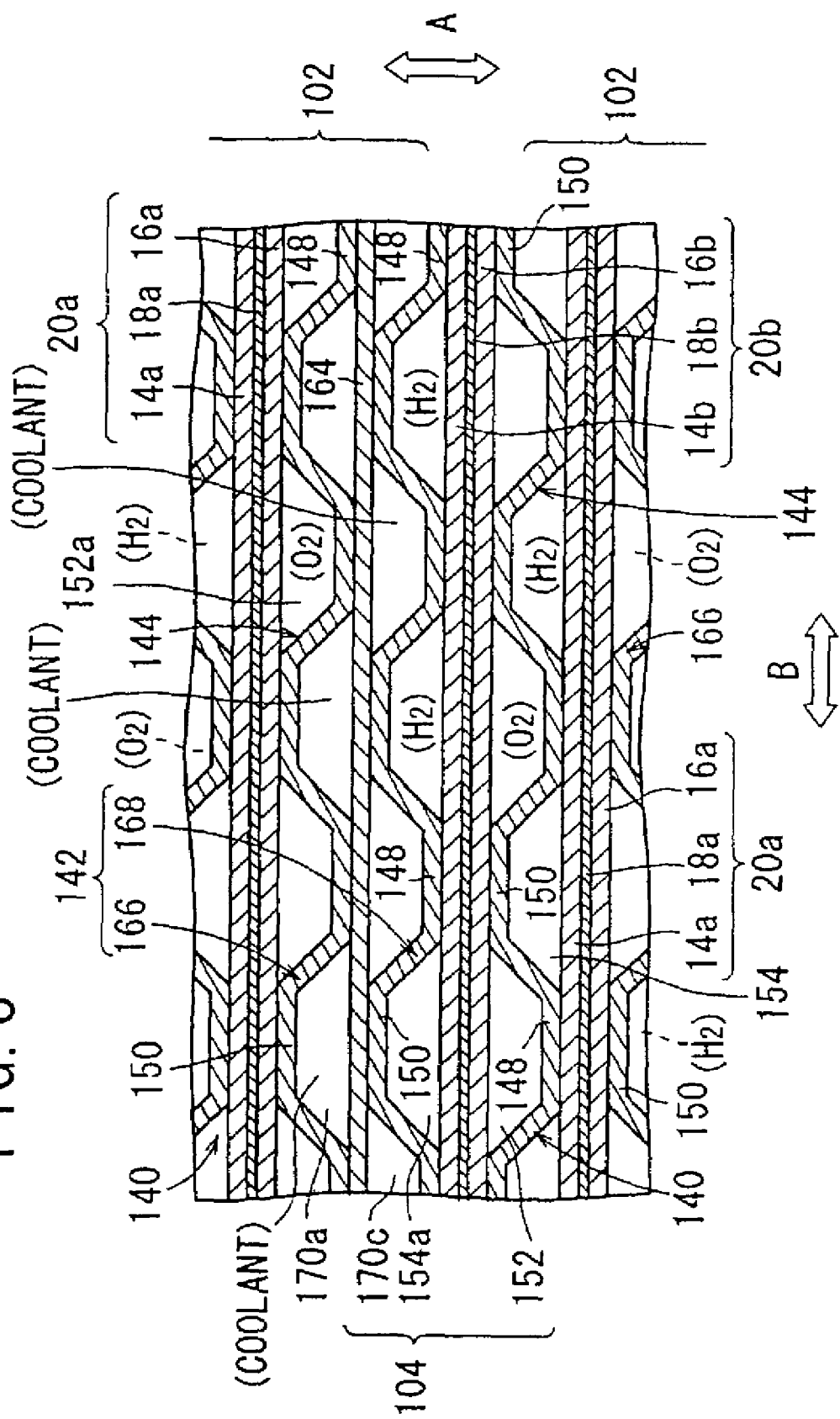
FIG. 3 is a schematic cross sectional view of a straight groove section of a cell assembly.

As shown in FIGS. 2 and 3, the first unit cell 102 includes a first membrane electrode assembly 20a comprising an anode 14a, a cathode 16a, and an ion exchange membrane 18a of a solid polymer electrolyte interposed between the anode 14a and the cathode 16a. The ion exchange membrane 18a is formed by impregnating a thin membrane of perfluorosulfonic acid with water, for example.

Each of the anode 14a and cathode 16a has a gas diffusion layer (not shown) such as a carbon cloth or a carbon paper, and an electrode catalyst layer (not shown) of platinum alloy supported on carbon particles. The carbon particles are deposited uniformly on the surface of the gas diffusion layer. The electrode catalyst layer of the anode 14a, and the electrode catalyst layer of the cathode 16a are fixed to opposite surfaces of the ion exchange membrane 18a, respectively. The first membrane electrode assembly 20a is interposed between the first separator 140 and the second separator 142 to form the first unit cell 102.

The second unit cell 104 includes a second membrane electrode assembly 20b which has substantially the same structure with the first membrane electrode assembly 20a. The constituent elements of the second membrane electrode assembly 20b that are identical to those of the first membrane electrode assembly 20a are labeled with the same reference numbers and an alphabet "b" instead of "a".

As shown in FIG. 3, the second membrane electrode assembly 20b is interposed between the first separator 140 and the second separator 142. As shown in FIG. 2, the first separator 140 is a thin metal sheet having a straight groove section 144 at its central portion. Straight grooves in the straight groove section 144 are extending in a direction indicated by an arrow C. Further, the first separator 140 has embossed sections 146 on both sides of the straight groove section 144. The straight groove sections 144 are formed on opposite surfaces of the first separator 140. The straight grooves 144 on one surface form straight protrusions on the other surface. Specifically, as shown in FIG. 3, the first separator 140 has first protrusions 148 in contact with the anode 14a of the first electrode membrane assembly 20a, and second protrusions 150 in contact with the cathode 16b of the second membrane electrode assembly 20b.

As shown in FIG. 3, the first straight protrusions 148 of the first separator 140 are in contact with the anode 14a of the first membrane electrode assembly 20a to form first straight grooves 152 as an oxygen-containing gas passage for supplying the oxygen-containing gas to the cathode 16b of the second electrode membrane assembly 20b. The second straight protrusions 140 are in contact with the cathode 16b to form second straight grooves 154 as a fuel gas flow passage for supplying the fuel gas to the anode 14a.

Figure 4:
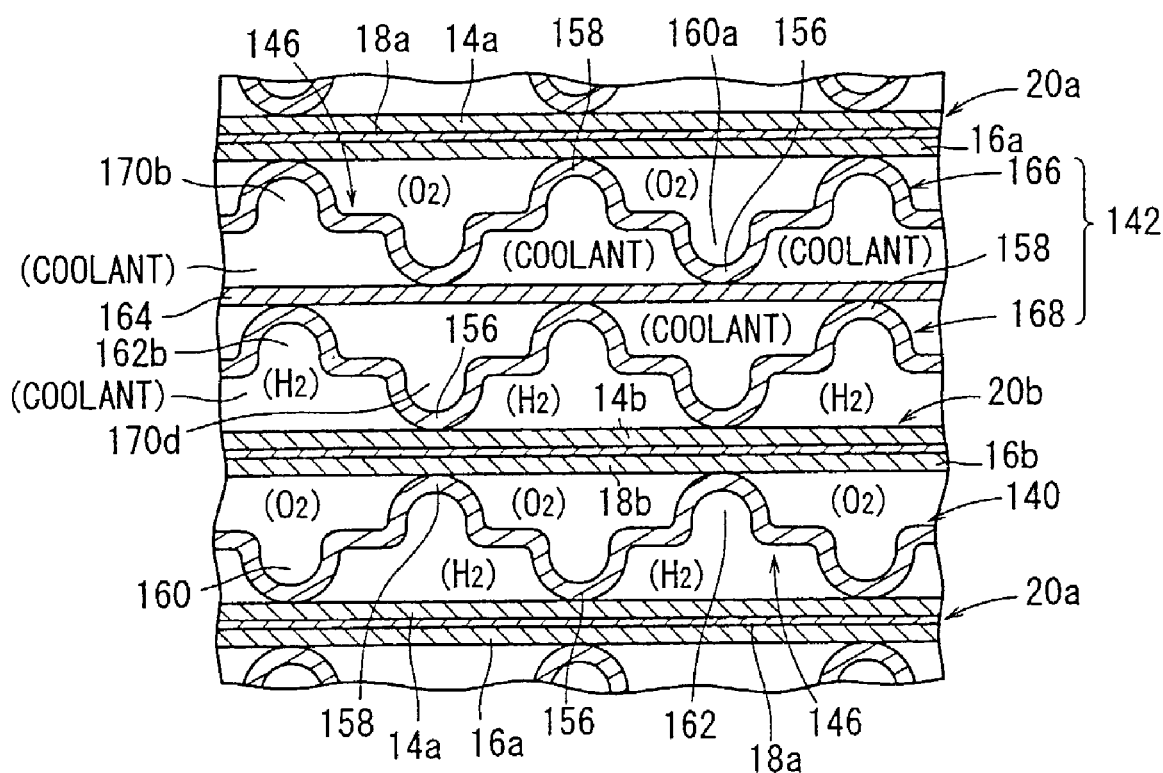
FIG. 4 is a schematic cross sectional view of an embossed section of the cell assembly.

As shown in FIGS. 2 and 4, the embossed section 146 in the first separator 140 includes first spherical protrusions 156 protruding toward the first membrane electrode assembly 20a, and second spherical protrusions 158 protruding toward the second membrane electrode assembly 20b. The first protrusions 156 are in contact with the anode 14a of the first membrane electrode assembly 20a to form first recesses 160 as an oxygen-containing gas flow passage. The second spherical protrusions 158 are in contact with the cathode 16b of the second membrane electrode assembly 20b to form second recesses 162 as a fuel gas flow passage.

The first recesses 160 are connected to the first straight grooves 152, the oxygen-containing gas supply passage 110, and the intermediate oxygen-containing gas passage 116 (see FIG. 2). The second recesses 162 are connected to the second straight grooves 154, the fuel gas supply passage 118, and the intermediate fuel gas passage 114.

The second separator 142 includes metal plates, i.e., a first separator plate 166, a second separator plate 168, and a leaf spring 164 interposed between the first separator plate 166 and the second separator plate 168. The first separator plate 166 and the second separator plate 168 have substantially the same structure with the first separator 140. The first separator plate 166 has first straight protrusions 148 and first protrusions 156 which are in contact with one surface of the leaf spring 164. Further, the first separator plate 166 has second straight protrusions 150 and second protrusions 158 which are in contact with the cathode 16a of the first membrane electrode assembly 20a (see FIGS. 3 and 4).

The second straight protrusions 150 and the second protrusions 158 between the first separator plate 166 and the leaf spring 164, form second straight grooves 170a and second recesses 170b, respectively. The second straight grooves 170a and the second recesses 170b form a coolant flow passage. The first straight protrusions 148 and the first protrusions 156 between the first separator plate 166 and the first membrane electrode assembly 20a form first straight grooves 152a and first recesses 160a, respectively. The first straight grooves 152 and the first recesses 160a form an oxygen-containing gas flow passage. The second recesses 170b are connected to the coolant supply passage 122, and the first recesses 160*b* are connected to the oxygen-containing gas supply passage 110 and the intermediate oxygen-containing gas passage 116.

The second separator plate 168 has first straight protrusions 148 and first protrusions 156 which are in contact with the anode 14*b* of the second membrane electrode assembly 20*b* to form second straight grooves 154*a* and second recesses 162*b* as a fuel gas flow passage between the second separator plate 168 and the second membrane electrode assembly 20*b*. The second separator 168 has second straight protrusions 150 and second protrusions 158 which are in contact with the leaf spring 164 to form first straight grooves 170*c* and first recesses 170*d* as a coolant flow passage. The second recesses 162 are connected to the intermediate fuel gas passage 114 and the fuel gas discharge passage 120. In the coolant flow passage, the first recesses 170*d* are connected to the second recesses 170*b* through a turning point at an end of the leaf spring 164, and connected to the coolant discharge passage 124.

As shown in FIG. 3, in the straight groove section 144 of the first separator plate 166, the first straight protrusions 148 of the first separator plate 166 are in alignment with (protrude toward) the first straight grooves 170*c* of the second separator plate 168, respectively. In the straight groove section 144 of the second separator plate 168, the second straight protrusions 150 of the second separator plate 168 are in alignment with (protrude toward) the second straight grooves 170*a* of the first separator plate 166, respectively.

As shown in FIG. 4, in the embossed section 146 of the first separator plate 166, the first protrusions 156 of the first separator plate 166 are in alignment with (protrude toward) the first recesses 170*d* of the second separator plate 168, respectively. The leaf spring 164 is interposed between the first protrusions 156 and the first recesses 170*d*. In the embossed section 146 of the second separator plate 168, the second protrusions 158 are in alignment with (protrude toward) the second recesses 170*b* of the first separator 166, respectively.

Figure 5:
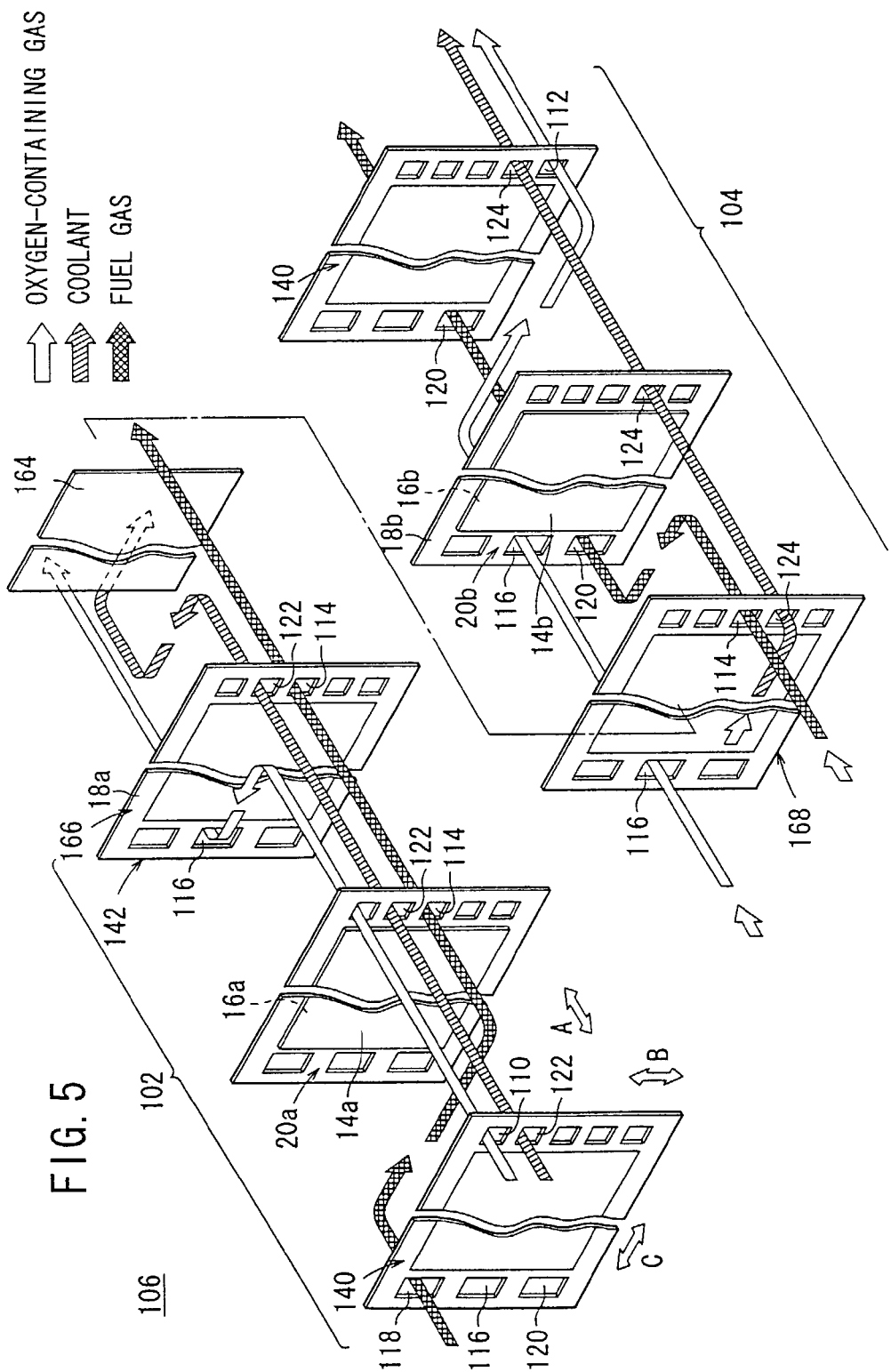
FIG. 5 is a view showing flows of a fuel gas, an oxygen-containing gas, and a coolant in the cell assembly.

As shown in FIG. 2, a dimension of the leaf spring 164 in the direction indicated by the arrow C is smaller than a total dimension of the straight groove section 144 and the two embossed sections 146. As shown in FIG. 5, the coolant flows between the first separator plate 166 and the leaf spring 164, flows back at an end of the leaf spring 164, and flows between the leaf spring 164 and the second separator plate 168.

The leaf spring 164 is a smooth metal plate. If a load is applied to the leaf spring 164, the leaf spring 164 is elastically deformed. After the application of the load is stopped, the leaf spring 64 returns to its original shape, and produces an elastic force. The leaf spring 164 is selected such that the leaf spring 164 pushes the first membrane assembly 20*a* through the second separator plate 168 and the second membrane assembly 20*b* through the first separator plate 166 with substantially a constant force even if the cell assemblies 106 are thermally expanded or contracted.

The spring constant of the leaf spring 164 is determined arbitrary depending on the expansion and contraction of the cell assembly 106, the thickness of the leaf spring 164, the distance between supporting points of the leaf spring 164, and the material of the leaf spring 164.

As shown in FIG. 1, terminal plates 34*a*, 34*b* are provided on opposite ends of the stacking body 108, respectively. Each of the terminal plates 34*a*, 34*b* has a tab 172. Further, insulator plates (not shown) for prevention of electric leakage are provided on the outside of the terminal plates 34*a*, 34*b*, and end plates 126, 174 are provided on the outside of the insulator plates. As described above, the end plate 126 has the oxygen-containing gas supply port 128, the oxygen-containing gas discharge port 130, the fuel gas supply port 132, the fuel gas discharge port 134, the coolant supply port 136, and the coolant discharge port 138.

Figure 6:
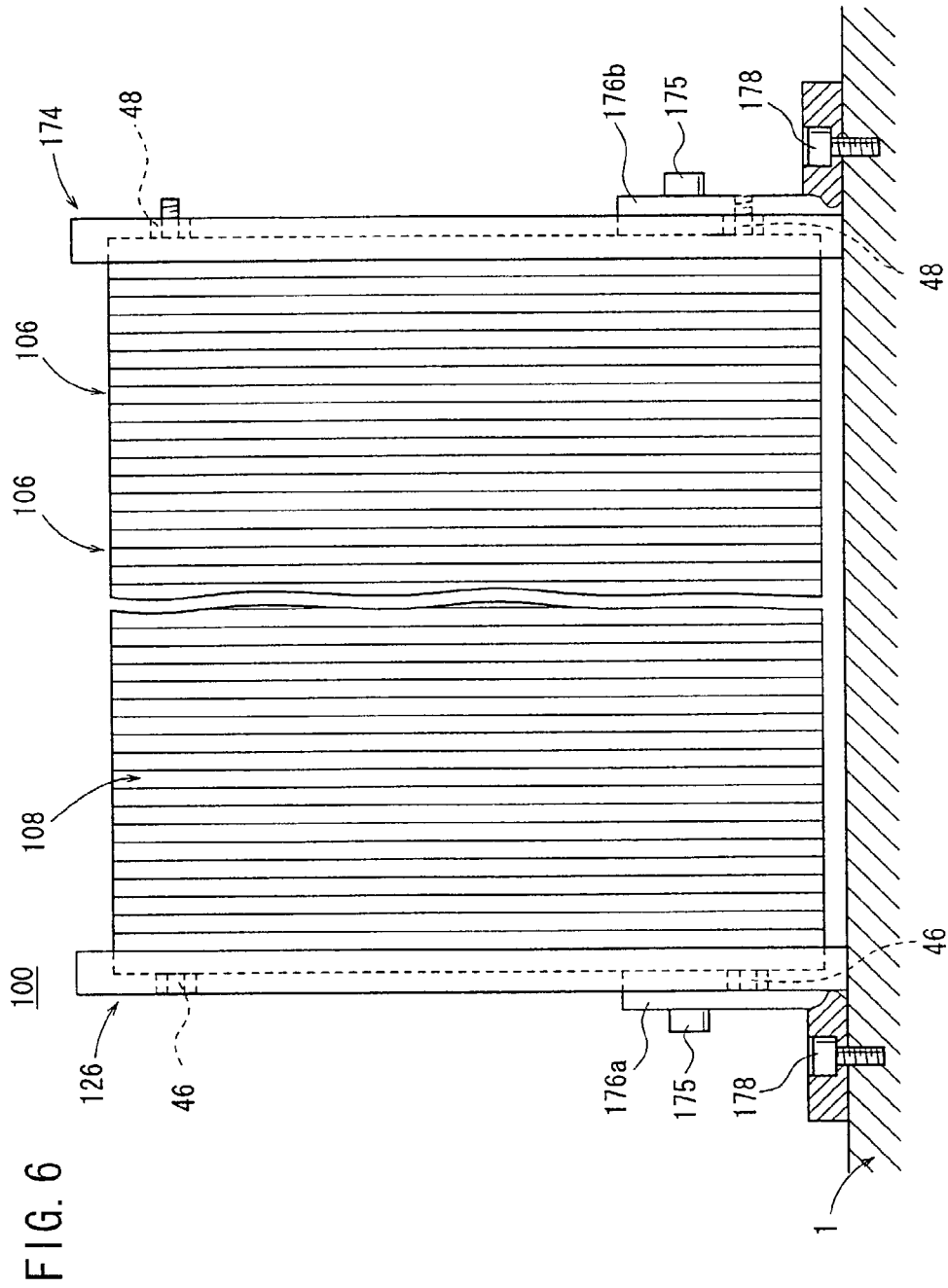
FIG. 6 is a schematic side view of the fuel cell stack in FIG. 1 taken along the stacking direction.
Figure 7:
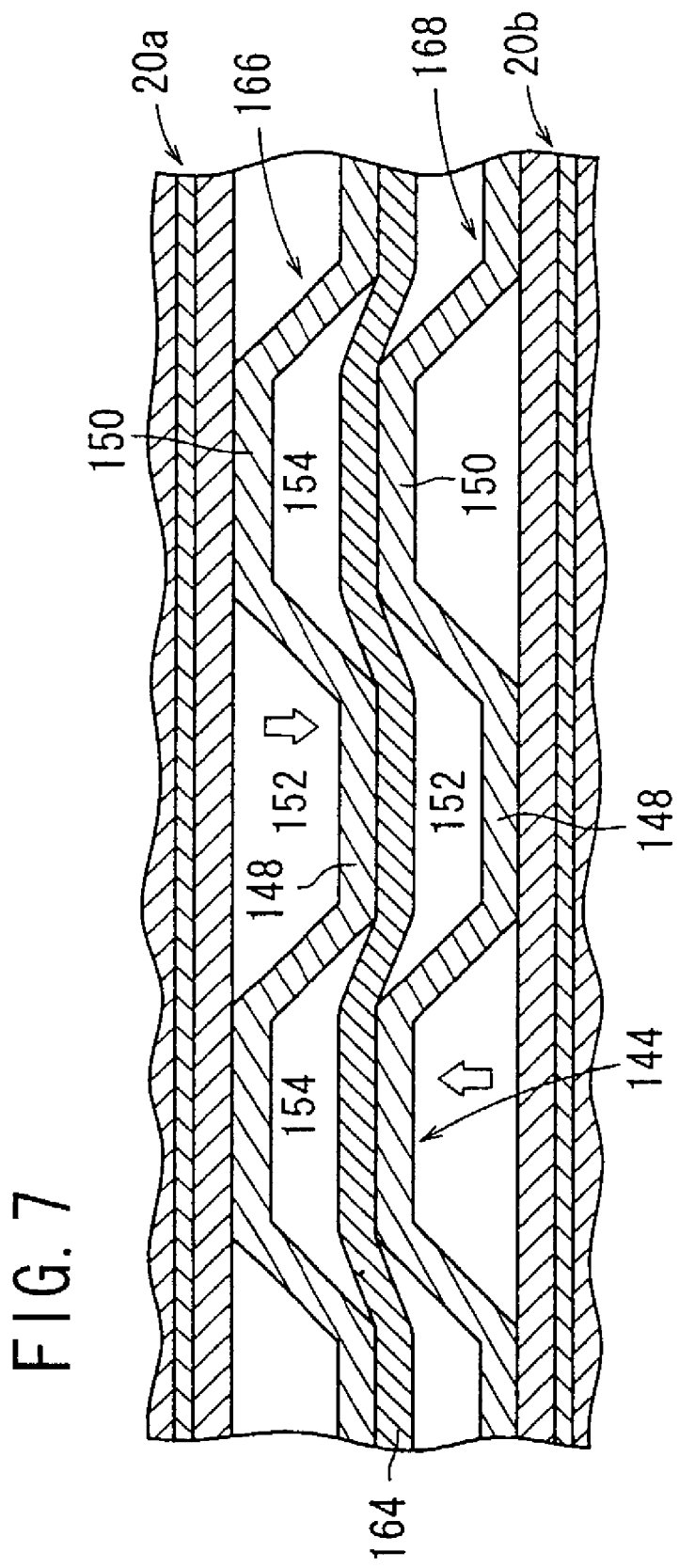
FIG. 7 is a view showing a leaf spring which is elastically deformed between the straight groove sections of a first separator place and a second separator plate.

The stacking body 108 has a plurality of holes (not shown) extending through the end plate 126 at one end to the end plate 174 at the other end, and tie rods 46 are inserted through the holes for tightening the stacking body 108 (see FIGS. 1 and 6). A nut (see FIG. 6) is threaded onto each of the tie rods 46. In this manner, the end plates 126, 174 are tightened to fix the stacking body 108, terminal plates 34*a*, 34*b*, and the end plates 126, 174 together under pressure. Brackets 176*a*, 176*b* are attached to the end plates 126, 174 with bolts 175, respectively. The brackets 176*a*, 176*b* are secured firmly to a vehicle body 1 with bolts 178. In the first embodiment, both of the brackets 176*a*, 176*b* are fixedly mounted on the vehicle body 1, and do not slide on the vehicle body 1.

A fuel gas supply source (not shown) is connected to the fuel gas supply port 132 of the end plate 126. A fuel gas collecting mechanism (not shown) is connected to the fuel gas discharge port 134. An oxygen-containing gas supply source (not shown) is connected to the oxygen-containing gas supply port 128. An oxygen-containing gas collecting mechanism (not shown) is connected to the oxygen-containing gas discharge port 130. A coolant supply source (not shown) is connected to the coolant supply port 136. Further, a coolant collecting mechanism (not shown) is connected to the coolant discharge port 138.

Next, an operation of the fuel cell stack 100 will be described.

In the fuel cell stack 100, a fuel gas such as a hydrogen-containing gas is supplied to the fuel gas supply port 132, an oxygen-containing gas such as air is supplied to the oxygen-containing gas supply port 128. Further, a coolant such as pure water, an ethylene glycol or an oil is supplied to the coolant supply port 136. From the fuel gas supply port 132, the oxygen-containing gas supply port 128, and the coolant supply port 136, the fuel gas, the oxygen-containing gas, and the coolant are supplied in series to each of the cell assemblies 106 stacked together in the direction indicated by the arrow A to form the cell stack 100 (see FIG. 5).

The fuel gas is supplied to the fuel gas supply passage 118 extending in the direction indicated by the arrow A. Then, as shown in FIGS. 3 and 4, the fuel gas flows through the second recesses 162 between the embossed sections 146 of the first separator 140 and the anode 14*a* of the first membrane electrode assembly 20*a*, and flows through the second straight grooves 154 between the straight groove section 144 of the first separator 140 and the anode 14*a* of the first membrane electrode assembly 20*a*. Thereafter, the fuel gas flows through the intermediate fuel gas passage 114 in the direction indicated by the arrow A. Further, on the downstream side, the fuel gas flows through the second recesses 162*b* between the embossed sections 146 of the second separator plate 168 of the second separator 142 and the anode 14*b* of the second membrane electrode assembly 20*b*, and flows through the second straight grooves 154*a* between the straight groove section 144 of the second separator plate 168 of the second separator 142 and the anode 14*b* of the second membrane electrode assembly 20*b*.

The oxygen-containing gas is supplied to the oxygen-containing gas supply passage 110. Then, the oxygen-containing gas flows through the first recesses 160*a* between the embossed sections 146 of the first separator plate 166 of the second separator 142 and the cathode 16*a* of the first membrane electrode assembly 20a, and flows through the first straight grooves 152a between the straight groove section 144 of the first separator plate 166 of the second separator 142 and the cathode 16a of the first membrane electrode assembly 20a. Thereafter, the oxygen-containing gas flows through the intermediate oxygen-containing gas passage 116 in the direction indicated by the arrow A. Further, on the downstream side, the oxygen-containing gas flows through the first recesses 160 between the embossed sections 146 of the first separator 140 and the cathode 16b of the second membrane electrode assembly 20b, and flows through the first straight grooves 152 between the straight groove section 144 of the first separator 140 and the cathode 16b of the second membrane electrode assembly 20b.

As described above, the fuel gas is supplied to the anode 14a of the first membrane electrode assembly 20a, and the anode 14b of the second membrane electrode assembly 20b. The oxygen-containing gas is supplied to the cathode 16a of the first membrane electrode assembly 20a, and the cathode 16b of the second membrane electrode assembly 20b. Thus, electricity (electromotive force) is generated by the chemical reactions at the electrodes. The electromotive force is used to energize a motor (not shown) which is electrically connected to the tabs 172 of the terminal plates 34a, 34b. The fuel gas and the oxygen-containing gas consumed at the electrodes flow into the fuel gas discharge passage 120 and the oxygen-containing gas discharge passage 112, respectively. Then, the fuel gas and the oxygen-containing gas are discharged from the fuel gas discharge port 134 and the oxygen-containing gas discharge port 130 of the end plate 126 to the fuel gas collecting mechanism and the oxygen-containing gas collecting mechanism, respectively.

The coolant supplied to the coolant supply passage 122 flows through the second recesses 170b and the second straight grooves 170a between the first separator plate 166 of the second separator 142 and the leaf spring 164 in the direction indicated by the arrow C. The coolant flows back at the end of the lea spring, and flows through the first recesses 170d and the first straight grooves 170c between the leaf spring 164 and the second separator plate 168 in the direction indicated by the arrow C. Then, the coolant flows through the coolant discharge passage 124 of the second separator plate 168. The coolant is discharged from the coolant discharge port 138 of the end plate 126 to the coolant collecting mechanism.

During the power generating operation, the temperature of the fuel cell stack 100 is increased to a predetermined temperature. The components of the fuel cell stack 100 are expanded by the heat in the stacking direction (the direction indicated by the arrow A in FIG. 1). Thus, the leaf spring 164 is elastically deformed between the straight groove section 144 of the first separator plate 166 and the straight groove section 144 of the second separator plate 168. Specifically, the leaf spring 164 is deformed between the first straight protrusions 148 of the first separator plate 166 and the first straight grooves 152 of the second separator plate 168, and deformed between the second protrusions 150 of the second separator plate 168 and the second straight grooves 154 of the first separator plate 166. Therefore, the first unit cell 102 and the second unit cell 104 are compressed by the elastic force of the leaf spring 164. The cell assemblies 106 of the stacking body 108 are compressed by a desired pressure. Therefore, electrical connections in the stacking body 108 are suitably maintained, and thus, the contact resistance between the first unit cell 102 and the second unit cell 104 is decreased. The overall power generation performance of the fuel cell stack 100 is improved.

Figure 8:
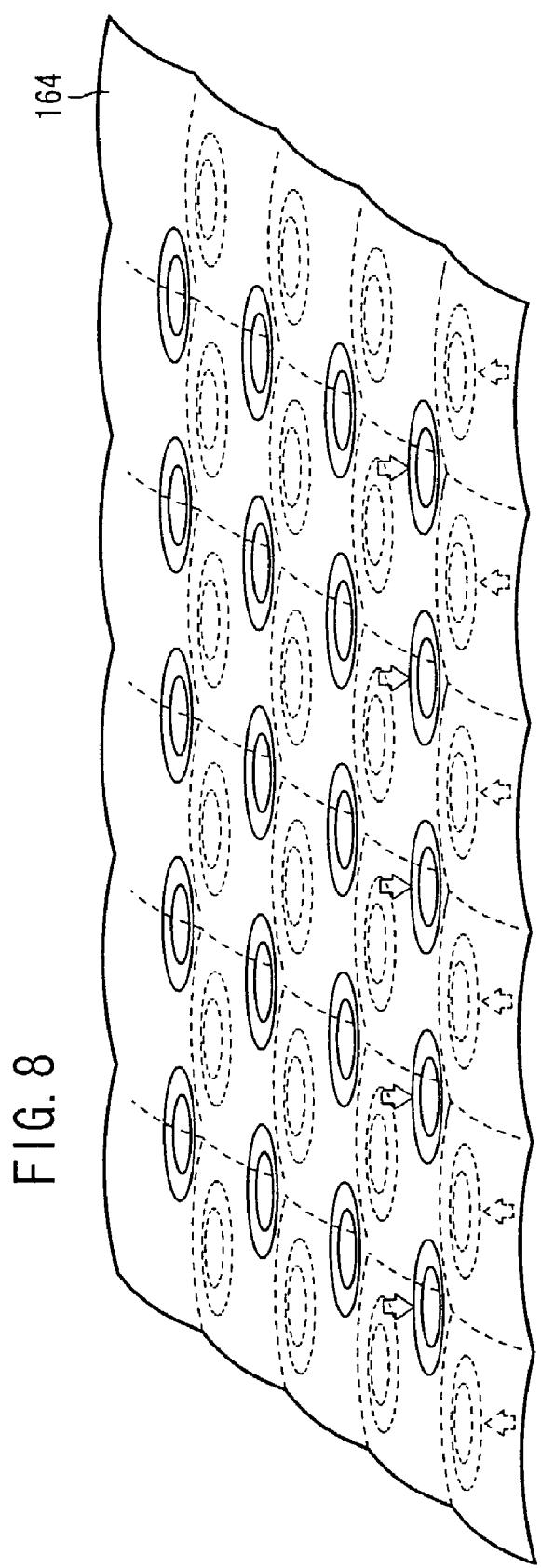
FIG. 8 is a perspective view showing the leaf spring which is elastically deformed between the embossed sections of the first separator and the second separator.

As shown in FIG. 4, in the embossed section 146 of the first separator plate 166 and the embossed section 146 of the second separator plate 168, the first protrusions 156 of the first separator plate 166 protrude toward the leaf spring 164, and the first recesses 170d of the second separator plate 168 are spaced from the leaf spring 164. The first protrusions 156 are in alignment with the first recesses 170d, respectively. The second protrusions 158 of the second separator plate 168 protrude toward the leaf spring 164, and the second recesses 170b of the first separator plate 166 are spaced from the leaf spring 164. The second protrusions 158 are in alignment with the second recesses 170b, respectively. Therefore, when the components of the fuel cell stack 100 are expanded by heat in the stacking direction, the leaf spring 164 is pressed by the first protrusions 156 and the second protrusions 158 in the embossed sections 146, and the leaf spring 164 is elastically deformed as shown in FIG. 8.

The end plates 126, 174 for tightening the stacking body 108 are connected to the brackets 176a, 176b. The brackets 176a, 176b are firmly mounted on the vehicle body 1. In the arrangement, the elastic deformation of the leaf spring 164 is effective for preventing heat expansion of the fuel cell stack 100. Therefore, heat stress is not applied to the fuel cell stack 100.

In the fuel cell stack 10 shown in FIG. 13, the bracket 52 is fixedly mounted on the vehicle body 1, and the bracket 50 is slidably mounted on the vehicle 1. In contrast, in the fuel cell stack 100, both of the brackets 176a, 176b are fixedly mounted on the vehicle body 1. Therefore, the load by vibrations or impacts applied to each of the brackets 176a, 176b is small in comparison with the load applied to the brackets 50, 52. Therefore, the size of the brackets 176a, 176b may be smaller than the size of the brackets 50, 52. Thus, the space needed for mounting the fuel cell stack 100 is small, and the weight of the brackets 176a, 176b is small.

When the operation of the fuel cell stack 100 is stopped and the temperature of the fuel cell stack 100 is lowered, the components of the fuel cell stack 100 are contracted in the stacking direction (in the direction indicated by the arrow A shown in FIG. 1). The leaf spring 164 returns to its original shape. The elastic force of the leaf spring 164 is applied to the first separator plate 166, and the second separator plate 168. Therefore, the stacking body 108 is kept tightly fastened under the pressure.

Even if the rigidity of the first membrane electrode assembly 20a, the second membrane electrode assembly 20b, the first separator 140, the second separator 142 (the first separator plate 166 and the second separator plate 168) are decreased, the elastic force of the leaf spring 164 is applied to the first separator plate 166 and the second separator plate 168. Therefore, the stacking body 108 is kept tightly fastened under the pressure.

Each of the first separator plate 166 and the second separator plate 168 has the two embossed sections 146 and straight groove section 144 between the embossed sections 146. The spherical first protrusions 156 and the spherical second protrusions 158 are provided alternately in each of the embossed sections 146. Therefore, the embossed sections 146 carry out a buffer function in the fuel gas flow passage and the oxygen-containing gas flow passage. Thus, the fuel gas and the oxygen-containing gas are distributed in the embossed sections 146 efficiently. The displacement amount of the embossed sections 146 and the displacement amount of the straight groove section 144 are equalized by determining a longitudinal pitch and a lateral pitch of the first protrusions 156 and the second protrusions 158.

Figure 9:
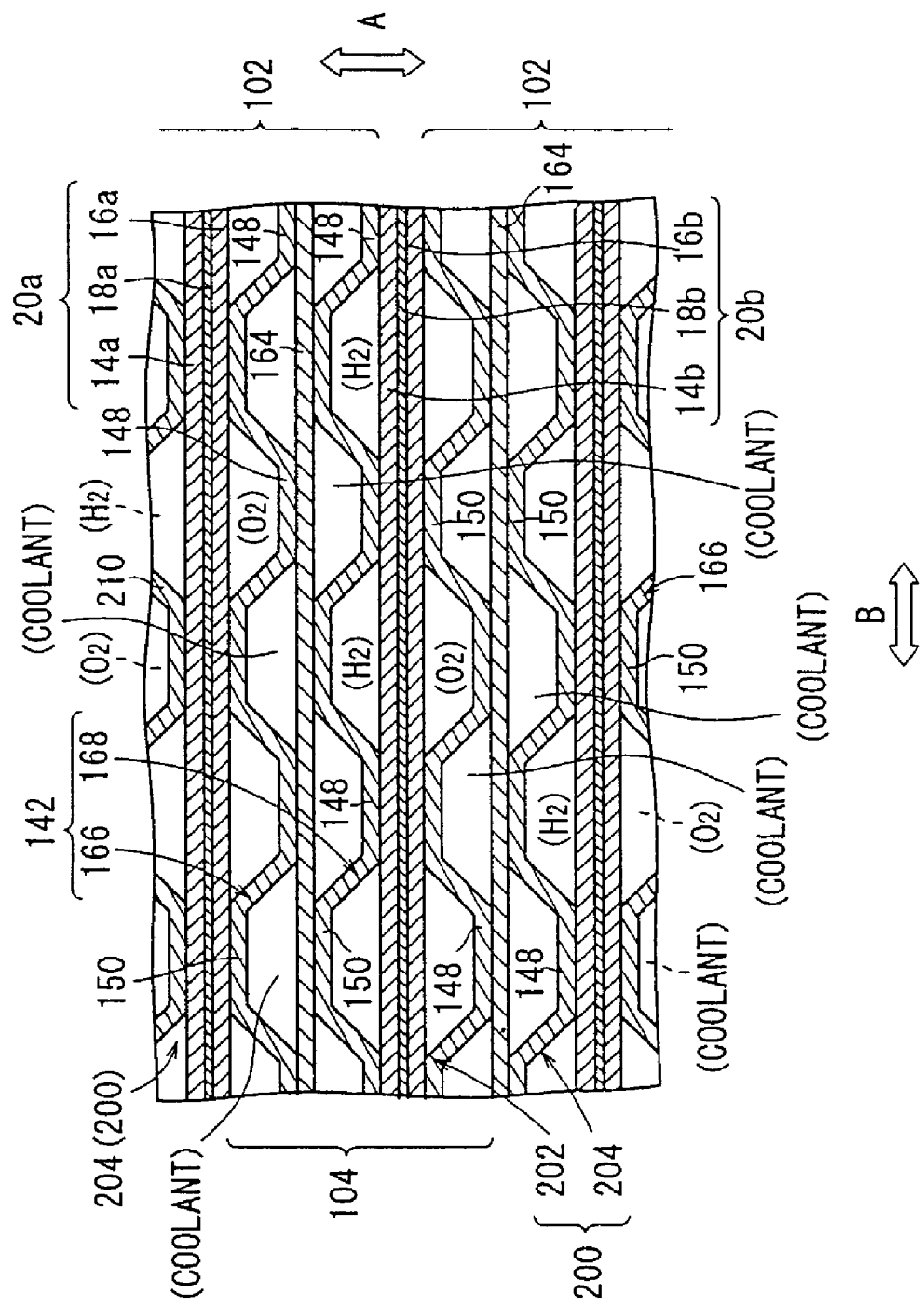
FIG. 9 is a schematic cross sectional view showing another example of the cell assembly.

In the first embodiment, only the second separator 142 includes the first separator plate 166 and the second separator plate 168, and the leaf spring 164 interposed between the first separator plate 166, and the second separator plate 168. Alternatively, in an example shown in FIG. 9, as with the second separator 142, the first separator 200 includes the first separator plate 202, and the second separator plate 204, and the leaf spring 164 interposed between the first separator plate 202 and the second separator plate 204.

In the first embodiment, the fuel gas, the oxygen-containing gas, and the coolant flow serially through the first unit cell 102, and then, through the second unit cell 104. However, the present invention is applicable to an ordinary fuel cell stack (not shown) in which the fuel gas, the oxygen-containing gas, and the coolant are separately supplied to each of unit cells.

Figure 10:
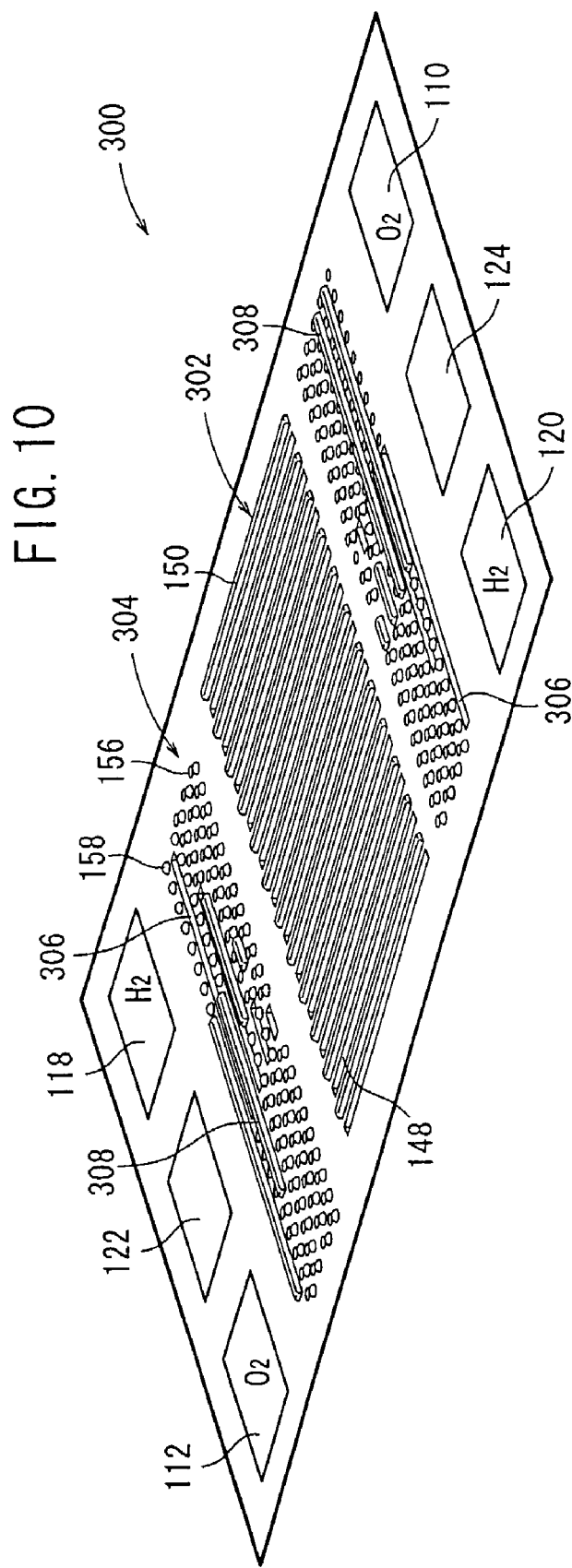
FIG. 10 is a schematic perspective view showing a separator of a fuel cell stack according to a second embodiment of the present invention.

FIG. 10 shows a separator 300 of a fuel cell stack according to a second embodiment of the present invention. The separator 300 may be used as the first separator 140, the first separator plate 166, the second separator plate 168 of the second separator 142 of the fuel cell stack 100 in the first embodiment. In the second embodiment, a third embodiment, and a fourth embodiment as described later on, the fuel gas, the oxygen-containing gas, and the coolant are not supplied serially to the unit cells. The fuel gas, the oxygen-containing gas, and the coolant are supplied in parallel to each of the unit cells.

The separator 300 has a fuel gas supply passage 118, a coolant supply passage 122, and an oxygen-containing gas discharge passage 112 at one end. Further, the separator 300 has an oxygen-containing gas supply passage 110, a coolant discharge passage 124, and a fuel gas discharge passage 120 at the other end.

The separator 300 has two embossed sections 304, and a straight groove section 302 between the embossed sections 304.

The straight groove section 302 and the embossed section 304 have substantially the same structure as the straight groove section 144 and the embossed section 146 in the first embodiment. The constituent elements of the straight groove section 302 and the embossed section 304 that are identical to those of the straight groove section 144 and the embossed section 146 are labeled with the same reference numeral, and description thereof is omitted.

In each of the embossed sections 304, a first protrusion 306 and a second protrusion 308 are formed. The first protrusion 306 and the second protrusion 308 extend in a direction perpendicular to straight protrusions in the straight groove section 302. The first protrusion 306 is formed on (protruding from) one surface of the separator 300, and the second protrusion 308 is formed on the other surface of the separator 300. The embossed section 304 functioning as a buffer has the first protrusion 306 for regulating the flow of the fuel gas, for example. Therefore, the fuel gas regulated by the first protrusion 306 flows uniformly along the surface of the separator 300. Thus, it is possible to suitably supply the fuel gas to an anode (not shown).

Further, the second protrusion 308 of the separator 300 regulates the flow of the oxygen-containing gas or the coolant. The oxygen-containing gas or the coolant regulated by the second protrusion 308 flows suitably.

Figure 11:
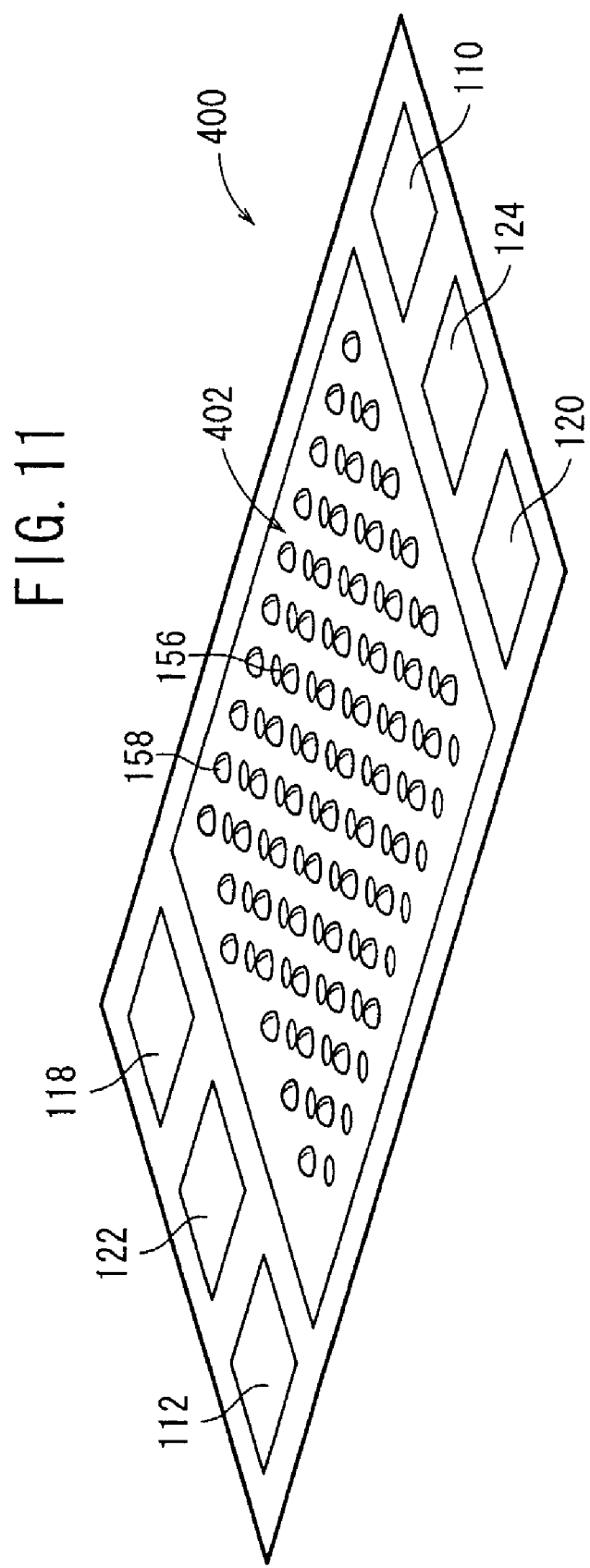
FIG. 11 is a schematic perspective showing a separator of a fuel cell stack according to a third embodiment of the present invention.

FIG. 11 is a schematic perspective view showing a separator 400 of a fuel cell stack according to the third embodiment of the present invention. In the third embodiment and the forth embodiment as described later on, the constituent elements that are identical to those of the separator 300 in the second embodiment are labeled with the same reference numeral, and description thereof is omitted.

The separator 400 has only an embossed section 402 which is a part of a reactant gas flow passage or a coolant flow passage. The fuel gas, the oxygen-containing gas, or the coolant gas flows along the surface of the separator 400 by suitably arranging first protrusions 156 and second protrusions 158 in the embossed section 402.

Figure 12:
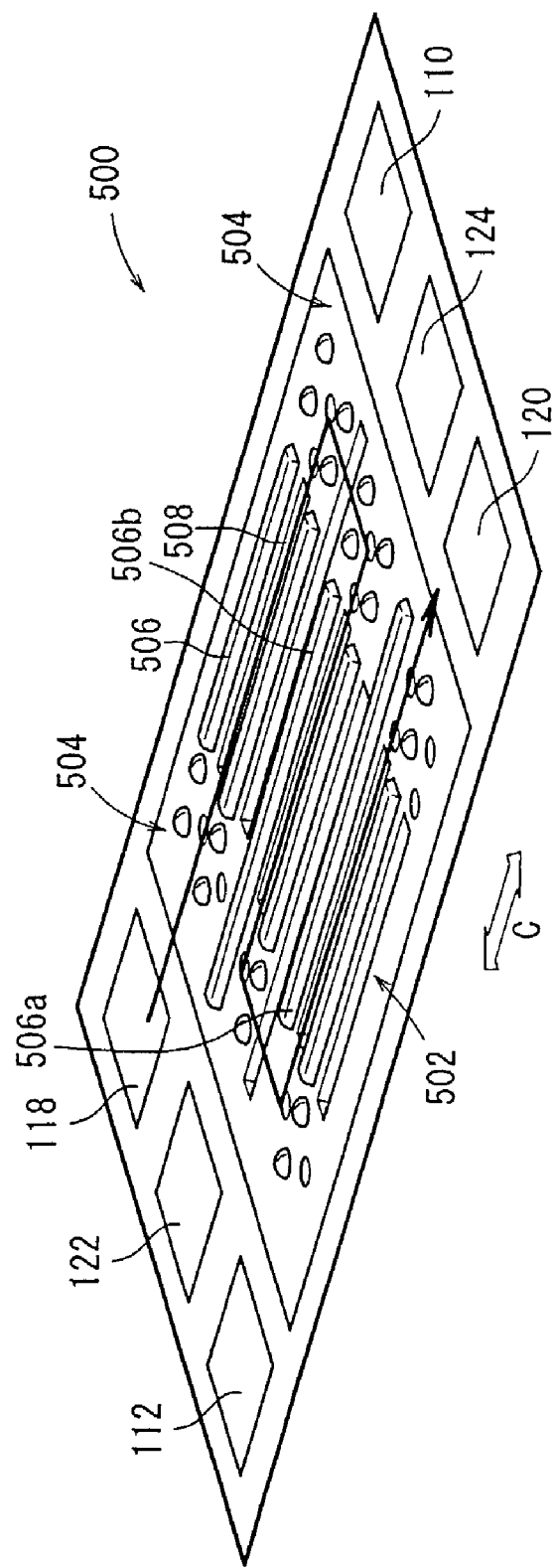
FIG. 12 is a schematic perspective view showing a separator according to a fourth embodiment of the present invention.

FIG. 12 is a schematic perspective view showing a separator 500 of a fuel cell stack according to the fourth embodiment of the present invention.

The separator 500 has a straight groove section 502 and embossed sections 504. In the straight groove section 502, second protrusions 506 are formed on (protruding from) a surface which is a part of a fuel gas flow passage, for example. First protrusions 508 are formed on the other surface.

The second protrusions 506 extend in a longitudinal direction of the separator 500 (a direction indicated by an arrow C). The fuel gas is supplied from the fuel gas supply passage 118 to the embossed section 504, and flows horizontally and downwardly through a serpentine passage formed by the second protrusions 506 to the fuel gas discharge passage 120. The second protrusions 506 include at least a pair of long protrusions 506a, 506b which are arranged alternately.

As described above, in the fourth embodiment, the fuel gas is supplied to the surface of the separator 500. The fuel gas flows horizontally and downwardly through the serpentine passage formed in the embossed sections 504 and the straight groove section 502. After a sufficient amount of the fuel gas is supplied to an anode (not shown), the fuel gas flows into the fuel gas discharge passage 120.

In the fuel cell stack of the present invention, when the components of the fuel cell stack are thermally expanded or contracted, the membrane electrode assemblies are pressed together by the elastic force of the leaf springs. Electrical connections between the adjacent unit cells are maintained. Therefore, belleville-springs or back up plates are not used in the fuel cell stack. It is possible to effectively reduce the dimension of the fuel cell stack in the stacking direction, and reduce the weight of the fuel cell stack.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a stacking body formed by stacking a plurality of assemblies each interposed between separators, each of said assemblies including an anode, a cathode, and an electrolyte interposed between said anode and said cathode, said stacking body being tightened by a pair of end plates provided at opposite ends of said stacking body in the stacking direction, wherein at least one of said separators includes a pair of separator plates and a metal plate interposed between said separator plates;

each of said separator plates has an embossed section comprising protrusions protruding toward said metal plate and recesses spaced from said metal plate; and said protrusions of said embossed section in one separator plate face said recesses of said embossed section in the other separator plate, respectively, wherein a coolant flow passage is formed between said metal plate and one separator plate, and between said metal plate and the other separator plate.

2. A fuel cell stack according to claim 1, wherein each of said separator plates has a straight groove section comprising protrusions protruding toward said metal plate and grooves spaced from said metal plate; and said protrusions of said straight groove section in one separator plate are in alignment with said grooves of said straight groove section in the other separator plate, respectively.

3. A fuel cell stack according to claim 2, wherein a straight reactant gas flow passage is formed between said membrane electrode assembly and said pair of separator plates, and a reactant gas flows through said straight reactant gas flow passage along said straight groove section.

4. A fuel cell stack according to claim 2, wherein a serpentine reactant gas flow passage is formed between said membrane electrode assembly and said pair of separator plates, and a reactant gas flows through said serpentine reactant gas flow passage along said straight groove section.

5. A fuel cell stack according to claim 1, wherein said metal plate is a leaf spring.

6. A fuel cell stack according to claim 1, further comprising a pair of brackets attached to said pair of end plates, said pair of brackets being secured to a vehicle body for mounting said fuel cell stack on said vehicle body.

* * * * *